(12) United States Patent
Barraclough et al.

(10) Patent No.: US 8,391,223 B2
(45) Date of Patent: Mar. 5, 2013

(54) RESOURCE ALLOCATION

(75) Inventors: Kristan Barraclough, Romsey (GB);
Sami-Jukka Hakola, Kempele (FI);
David Randall, Romsey (GB); Markus Wimmer, Kielczów (PL)

(73) Assignee: Nokia Siemens Networks Oy, Espoo (FI)

( * ) Notice: Subject to any disclaimer, the term of this patent is extended or adjusted under 35 U.S.C. 154(b) by 276 days.

(21) Appl. No.: 12/695,307

(22) Filed: Jan. 28, 2010

(65) Prior Publication Data

US 2010/0182974 A1 Jul. 22, 2010

Related U.S. Application Data

(63) Continuation of application No. PCT/EP2008/060179, filed on Aug. 1, 2008.

(60) Provisional application No. 60/998,015, filed on Oct. 5, 2007.

(30) Foreign Application Priority Data

Aug. 1, 2007 (GB) .................................. 0714927.1

(51) Int. Cl.
*H04W 72/00* (2009.01)
(52) U.S. Cl. ......................... 370/329; 370/461; 370/462
(58) Field of Classification Search .................. None
See application file for complete search history.

(56) References Cited

U.S. PATENT DOCUMENTS

| | | | | |
|---|---|---|---|---|
| 5,802,102 A | 9/1998 | Davidovici | .................... | 375/207 |
| 5,862,133 A | 1/1999 | Schilling | ...................... | 370/342 |
| 5,864,578 A | 1/1999 | Yuen | ............................ | 375/200 |
| 5,872,808 A | 2/1999 | Davidovici et al. | ........... | 375/207 |
| 5,894,494 A | 4/1999 | Davidovici | .................... | 375/208 |
| 5,933,447 A | 8/1999 | Tran et al. | ..................... | 375/207 |
| 5,956,369 A | 9/1999 | Davidovici et al. | ........... | 375/207 |
| 5,956,375 A | 9/1999 | Kanterakis | .................... | 375/326 |
| 5,963,583 A | 10/1999 | Davidovici et al. | ........... | 375/200 |
| 5,999,562 A | 12/1999 | Hennedy et al. | ............... | 375/207 |
| 6,014,405 A | 1/2000 | Garodnick et al. | ........... | 375/200 |
| 6,021,157 A | 2/2000 | Davidovici et al. | ........... | 375/200 |

(Continued)

FOREIGN PATENT DOCUMENTS

| | | |
|---|---|---|
| CN | 1327697 A | 12/2001 |
| RU | 2005117334 A | 11/2006 |

(Continued)

OTHER PUBLICATIONS

U.S. Appl. No. 60/975,715, filed Sep. 27, 2007.*

(Continued)

*Primary Examiner* — Kwang B Yao
*Assistant Examiner* — Alex Skripnikov
(74) *Attorney, Agent, or Firm* — Harrington & Smith

(57) ABSTRACT

The present invention relates to an apparatus and a method for indicating a channel resource. The apparatus including a transmitter arranged to transmit an indicating acquisition indication channel signature wherein said indicating signature is used to indicate an enhanced dedicated channel resource (uplink resource set) to be used by a user equipment; a memory configured to store a mapping associating a random access channel signature sequence to one or more of the indicating acquisition indication channel signatures; and a data processor configured to use the stored mapping to relate a random access channel signature sequence to one or more of the indicating acquisition indication channel signatures; configured to relate each indicating acquisition indication channel signature to an uplink resource set such there is a three-way mapping between the random access channel signature sequence, the one or more indicating acquisition indication channel signatures and the uplink resource set.

18 Claims, 12 Drawing Sheets

U.S. PATENT DOCUMENTS

| | | | | |
|---|---|---|---|---|
| 6,041,073 | A | 3/2000 | Davidovici et al. | 375/148 |
| 6,061,359 | A | 5/2000 | Davidovici et al. | 370/441 |
| 6,075,793 | A | 6/2000 | Garodnick et al. | 370/441 |
| 6,078,576 | A | 6/2000 | Garodnick et al. | 370/347 |
| 6,108,327 | A | 8/2000 | Garodnick et al. | 370/342 |
| 6,122,328 | A | 9/2000 | Kanterakis | 369/58 |
| 6,130,906 | A | 10/2000 | Davidovici et al. | 375/152 |
| 6,154,483 | A | 11/2000 | Davidovici et al. | 375/130 |
| 6,160,803 | A | 12/2000 | Garodnick et al. | 370/342 |
| 6,169,759 | B1 | 1/2001 | Kanterakis et al. | |
| 6,212,244 | B1 | 4/2001 | Davidovici et al. | 375/345 |
| 6,215,811 | B1 | 4/2001 | Yuen | 375/143 |
| 6,262,971 | B1 | 7/2001 | Schilling | 370/208 |
| 6,301,286 | B1 | 10/2001 | Kanterakis et al. | |
| 6,304,592 | B1 | 10/2001 | Davidovici et al. | 375/152 |
| 6,324,207 | B1 | 11/2001 | Kanterakis et al. | 375/141 |
| 6,324,209 | B1 | 11/2001 | Li et al. | 375/146 |
| 6,324,210 | B1 | 11/2001 | Li et al. | 375/152 |
| 6,349,110 | B1 | 2/2002 | Davidovici et al. | 375/207 |
| 6,389,056 | B1 | 5/2002 | Kanterakis et al. | 375/130 |
| 6,393,049 | B1 | 5/2002 | Davidovici et al. | 375/142 |
| 6,400,757 | B1 | 6/2002 | Davidovici et al. | 375/152 |
| 6,480,525 | B1* | 11/2002 | Parsa et al. | 375/141 |
| 6,507,601 | B2 | 1/2003 | Parsa et al. | |
| 6,515,981 | B1 | 2/2003 | Davidovici et al. | 370/342 |
| 6,574,267 | B1 | 6/2003 | Kanterakis et al. | 375/141 |
| 6,587,452 | B1 | 7/2003 | Davidovici et al. | 370/342 |
| 6,606,341 | B1 | 8/2003 | Kanterakis et al. | |
| 6,631,157 | B1 | 10/2003 | Davidovici et al. | 375/148 |
| 6,639,936 | B2 | 10/2003 | Kanterakis et al. | 375/130 |
| 6,643,318 | B1 | 11/2003 | Parsa et al. | |
| 6,714,586 | B2 | 3/2004 | Li et al. | 375/148 |
| 6,717,975 | B2 | 4/2004 | Kanterakis et al. | |
| 6,741,637 | B1 | 5/2004 | Shen et al. | 375/149 |
| 6,757,319 | B1 | 6/2004 | Kanterakis et al. | 375/141 |
| 6,801,569 | B1 | 10/2004 | Yang et al. | 375/152 |
| 6,842,480 | B1 | 1/2005 | Li et al. | 375/152 |
| 6,843,597 | B1 | 1/2005 | Li et al. | 374/345 |
| 6,917,602 | B2 | 7/2005 | Toskala et al. | |
| 6,993,344 | B2 | 1/2006 | Yotsumoto | 455/452.1 |
| 7,406,044 | B2* | 7/2008 | Cave et al. | 370/230.1 |
| 2004/0264497 | A1 | 12/2004 | Wang et al. | 370/456 |
| 2005/0047347 | A1 | 3/2005 | Lee et al. | 370/241 |
| 2007/0064665 | A1* | 3/2007 | Zhang et al. | 370/343 |
| 2007/0184842 | A1 | 8/2007 | Mogensen et al. | 455/452 |
| 2007/0206531 | A1 | 9/2007 | Korhonen et al. | 370/329 |
| 2007/0224990 | A1 | 9/2007 | Edge et al. | 455/436 |
| 2007/0263579 | A1 | 11/2007 | Ozluturk | 370/338 |
| 2007/0270140 | A1 | 11/2007 | Islam et al. | 455/423 |
| 2007/0291685 | A1 | 12/2007 | Fiat | 370/328 |
| 2007/0291708 | A1 | 12/2007 | Rao | 370/338 |
| 2008/0043671 | A1 | 2/2008 | Hong et al. | 370/329 |
| 2008/0075043 | A1 | 3/2008 | Chandra et al. | 370/330 |
| 2008/0095185 | A1 | 4/2008 | Cave et al. | 370/464 |
| 2008/0108346 | A1 | 5/2008 | Mittal et al. | 455/432.1 |
| 2008/0192766 | A1* | 8/2008 | Ranta-Aho et al. | 370/445 |
| 2009/0088175 | A1* | 4/2009 | Pelletier et al. | 455/450 |

FOREIGN PATENT DOCUMENTS

| | | |
|---|---|---|
| WO | WO 01/10157 | 2/2001 |
| WO | WO 01/73970 | 10/2001 |
| WO | WO 03/090390 A1 | 10/2003 |
| WO | WO 2007/078165 | 7/2007 |
| WO | WO 2008/038124 | 4/2008 |
| WO | WO 2008/090528 A1 | 7/2008 |

OTHER PUBLICATIONS

3GPP TS 25.211 V3.12.0 (Sep. 2002), Technical Specification, 3rd Generation Partnership Project; Technical Specification Group Radio Access Network; Physical channels and mapping of transport channels onto physical channels (FDD), (Release 1999), 46 pages.

3GPP TS 25.212 V3.11.0 (Sep. 2002), Technical Specification, 3rd Generation Partnership Project; Technical Specification Group Radio Access Network; Multiplexing and channel coding (FDD), (Release 1999), 62 pages.

3GPP TS 25.213 V3.9.0 (Dec. 2003), Technical Specification, 3rd Generation Partnership Project; Technical Specification Group Radio Access Network; Spreading and modulation (FDD), (Release 1999), 26 pages.

3GPP TS 25.214 V3.12.0 (Mar. 2003), Technical Specification, 3rd Generation Partnership Project; Technical Specification Group Radio Access Network; Physical layer procedures (FDD), (Release 1999), 52 pages.

3GPP TS 25.215 V3.13.0 (Mar. 2005), Technical Specification, 3rd Generation Partnership Project; Technical Specification Group Radio Access Network; Physical layer—Measurements (FDD), (Release 1999), 18 pages.

3GPP TS 25.211 V4.6.0 (Sep. 2002), Technical Specification, 3rd Generation Partnership Project; Technical Specification Group Radio Access Network; Physical channels and mapping of transport channels onto physical channels (FDD), (Release 4), 46 pages.

3GPP TS 25.212 V4.6.0 (Sep. 2002), Technical Specification, 3rd Generation Partnership Project; Technical Specification Group Radio Access Network; Multiplexing and channel coding (FDD), (Release 4), 62 pages.

3G TS 25.213 V4.4.0 (Dec. 2003), Technical Specification, 3rd Generation Partnership Project; Technical Specification Group Radio Access Network; Spreading and modulation (FDD), (Release 4), 26 pages.

3GPP TS 25.214 V4.6.0 (Mar. 2003), 3rd Generation Partnership Project; Technical Specification Group Radio Access Network; Physical layer procedures (FDD), (Release 4), 53 pages.

3GPP TS 25.215 V4.8.0 (Mar. 2005), Technical Specification, 3rd Generation Partnership Project; Technical Specification Group Radio Access Network; Physical layer—Measurements (FDD), (Release 4), 18 pages.

3GPP TS 25.211 V5.8.0 (Dec. 2005), Technical Specification, 3rd Generation Partnership Project; Technical Specification Group Radio Access Network; Physical channels and mapping of transport channels onto physical channels (FDD), (Release 5), 39 pages.

3GPP TS 25.212 V5.10.0 (Jun. 2005), Technical Specification, 3rd Generation Partnership Project; Technical Specification Group Radio Access Network; Multiplexing and channel coding (FDD), (Release 5), 72 pages.

3GPP TS 25.213 V5.6.0 (Jun. 2005), Technical Specification, 3rd Generation Partnership Project; Technical Specification Group Radio Access Network; Spreading and modulation (FDD), (Release 5), 25 pages.

3GPP TS 25.214 V5.11.0 (Jun. 2005), Technical Specification, 3rd Generation Partnership Project; Technical Specification Group Radio Access Network; Physical layer procedures (FDD), (Release 5), 51 pages.

3GPP TS 25.215 V5.7.0 (Jun. 2005), Technical Specification, 3rd Generation Partnership Project; Technical Specification Group Radio Access Network; Physical layer—Measurements (FDD), (Release 5), 17 pages.

3GPP TS 25.211 V6.8.0 (Sep. 2007), Technical Specification, 3rd Generation Partnership Project; Technical Specification Group Radio Access Network; Physical channels and mapping of transport channels onto physical channels (FDD), (Release 6), 51 pages.

3GPP TS 25.212 V6.10.0 (Dec. 2006), Technical Specification, 3rd Generation Partnership Project; Technical Specification Group Radio Access Network; Multiplexing and channel coding (FDD) (Release 6), 84 pages.

3GPP TS 25.213 V6.5.0 (Mar. 2006), Technical Specification, 3rd Generation Partnership Project; Technical Specification Group Radio Access Network; Spreading and modulation (FDD), (Release 6), 32 pages.

3GPP TS 25.214 V6.11.0 (Dec. 2006), Technical Specification, 3rd Generation Partnership Project; Technical Specification Group Radio Access Network; Physical layer procedures (FDD), (Release 6), 60 pages.

3GPP TS 25.215 V6.4.0 (Sep. 2005), Technical Specification, 3rd Generation Partnership Project; Technical Specification Group Radio Access Network; Physical layer—Measurements (FDD), (Release 6), 18 pages.

Nokia, Nokia Siemens Networks, Resource assignment for E-DCH access in CELL_FACH state, 3GPP TSG-RAN WG1 Meeting #50-BIS, R1-074303, XP002467707, Oct. 8-12, 2007, 5 pages, Shanghai, China.

Nokia, Further discussion on delay enhancements in Rel7, 3GPP TSG-RAN WG2 Meeting #53, R2-061189, May 8-12, 2006, 5 pages, Shanghai, China.

U.S. Appl. No. 60/848,106, filed Sep. 29, 2006, Wigard et al.

U.S. Appl. No. 60/891,328, filed Jan. 25, 2007, Ranta-aho et al.

* cited by examiner

RESOURCE ALLOCATION

CROSS REFERENCE TO RELATED APPLICATION

This application is a continuation of International Patent Application Number PCT/EP2008/060179 filed on Aug. 1, 2008; which claims priority to GB Patent Application Number 0714927.1 filed on Aug. 1, 2007; and U.S. Provisional Application No. 60/998,015 filed on Oct. 5, 2007.

FIELD OF THE INVENTION

The present invention relates to an apparatus and a method for indicating a channel resource.

BACKGROUND

The following abbreviations and terms are herewith defined:

| | |
|---|---|
| 3GPP | third generation partnership project |
| ACK/NACK | acknowledged/not acknowledged |
| AI | acquisition indicator |
| AICH | acquisition indicator channel |
| BCCH | broadcast control channel |
| CQI | channel quality indicator |
| DPCCH | dedicated physical control channel |
| DPCH | dedicated physical channel |
| DPDCH | dedicated physical data channel |
| DL | downlink (e.g., node B to UE) |
| E-DCH | enhanced dedicated physical channel |
| E-DPDCH | enhanced dedicated physical data channel |
| E-DPCCH | enhanced dedicated physical control channel |
| E-HICH | enhanced HICH (also known as E-DCH HARQ AI channel) |
| E-node B | enhanced node B (of an LTE system) |
| E-UTRAN | enhanced UTRAN, also known as 3.9G or LTE |
| F-DPCH | fractional dedicated physical channel |
| HICH | hybrid automatic repeat request indicator channel |
| HSUPA | high speed uplink packet access |
| L1 | layer 1 (control signalling layer) |
| LTE | long term evolution of 3GPP |
| Node B | base station (e.g., node B) |
| OFDM | orthogonal frequency division multiplex |
| PRACH | physical (or packet) random access channel |
| RACH | random access channel |
| SIB | system information block (also termed master information block) |
| UE | user equipment (e.g., mobile equipment/station) |
| UL | uplink (e.g., UE to node B) |
| UMTS | universal mobile telecommunications system |
| UTRAN | UMTS terrestrial radio access network |

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various applications.

A communication system is a facility which facilitates the communication between two or more entities such as the communication devices, network entities and other nodes. A communication system may be provided by one more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol.

In the cellular systems a network entity in the form of a base station provides a node for communication with mobile devices in one or more access entities, otherwise known as cells or sectors. It is noted that in certain systems a base station is called 'Node B'.

Typically the operation of a base station apparatus and other apparatus of an access system required for the communication is controlled by a particular control entity. The control entity is typically interconnected with other control entities of the particular communication network. For example, a radio network controller (RNC) provides control functions in Universal Terrestrial Radio Access Networks (UTRAN) and a base station controller (BSC) provides control functions in GSM (Global System for Mobile) EDGE (Enhanced Data for GSM Evolution) Radio Access Networks (GERAN).

The enhanced dedicated channel has been proposed in the third generation specifications—3GPP (third generation partnership project.

3GPP is standardizing the long-term evolution (LTE) of the radio-access technology which aims to achieve reduced latency, higher user data rates, improved system capacity and coverage, and reduced cost for the operator. The current understanding of LTE relevant to these teachings may be seen at 3GPP TR 25.214 (v4.6.0, 2003-03) entitled PHYSICAL LAYER PROCEDURES (FDD) and herein incorporated by reference. Both frequency division duplex FDD and time division duplex TDD multiple access schemes are considered in LTE. The description in background and the below examples of implementations of the invention are in the context of LTE, though LTE is not a limitation to the environment in which embodiments of the invention may be deployed.

In LTE, an uplink access channel, broadly referred to herein as the RACH, is one typically utilized by the UE for initial access signaling to a network in instances when no dedicated or shared physical channel connection is currently established. For example, the RACH can be used for initial cell access after the UE powers-on. The RACH can be used to perform a location update after the UE moves from one location to another or for initiating a call or for user data transmission. 3GPP specifies that the UE transmit on the RACH a series of access preambles each with increasing transmit power for each access preamble attempt. Each of the access attempts is separated by an appropriate waiting time of sufficient duration to allow detection of an acknowledgment indication (AI) signal from the receiving station Node B. The node B sends the AI on the AICH, and it may indicate ACK, NACK, or no response. There are certain automatic repeat request ARQ procedures that may be followed if the UE does not receive a response to its RACH preamble. Such ARQ procedures are further described for example at co-owned U.S. Pat. No. 6,917,602, issued on Jul. 12, 2005 and entitled "System and Method for Random Access Channel Capture with Automatic Retransmission Request".

Early development of LTE [3GPP Release 99 specifications (e.g., 25.211-25.215 of Release 99 or Release 4)], considered that once the AI signal was received the UE sent its message on an uplink common packet channel (CPCH), which was seen as an extension of the RACH. Aspects of how the CPCH might have been implemented are detailed, for example, at U.S. Pat. Nos. 6,169,759; 6,301,286; 6,606,341; 6,717,975; and particularly relevant to the RACH at U.S. Pat. Nos. 6,507,601 and 6,643,318. The CPCH was not implemented and it was removed from 3GPP Release 5 specifications. The CPCH did not include certain L1 enhancements since those solutions were included to the uplink only with HSUPA in Release 6. Those L1 enhancements include fast L1 retransmission, hybrid ARQ, and fast capacity allocations. Allocation of a bit rate on the CPCH was fixed, like on the RACH. The CPCH concept introduced a channel allocation scheme which was based on some level of signature combinations, but dynamic assigning of a dedicated resource was rather limited. As noted in U.S. Pat. No. 6,917,602, another procedure was that once the UE receives the AI signal, the UE was allowed to transmit its message on the RACH and the random access procedure would then terminate.

Usage of an enhanced dedicated channel (E-DCH) as random access channel (RACH) shared channel has been described in U.S. patent application No. 60/848,106 and collision detection for random access procedure has been described in U.S. patent application No. 60/897,328. These aim to create a base for high speed and high data rate random access, hereinafter called High Speed Random Access Channel (HS-RACH). There are ongoing investigations as to which techniques of high speed uplink packet access (HSUPA), such as fast inner loop power control, varying bit rate, Node B scheduling with grants, fast acknowledgment/negative acknowledgment (ACK/NACK) for downlink (DL) transmission can be used already in the random access phase. HSUPA is sometimes referred to Enhanced uplink EUL.

The HS-RACH concept has been disclosed in WO2008038124.

The HS-RACH concept has been decomposed in several steps or phases, which are outlined below and illustrated in FIG. 1

(1) Determination of uplink (UL) interference level for open loop power control;

(2) Release99 random access procedure with power ramp-up using specific HS-RACH access slots and signatures indicated in system information block (SIB);

(3) Access Grant and Resource Assignment;

(4) Start of inner loop power control in UL, e.g. on dedicated physical control channel (DPCCH);

(5) Start of inner loop power control in DL, e.g. on fractional dedicated physical control channel (F-DPCH);

(6) Start of UL data transmission, e.g. on E-DCH dedicated physical data channel (E-DPDCH)/E-DCH dedicated physical control channel (E-DPCCH);

(7) subsequent Resource Assignment (update of existing resource assignment) and collision detection and resolution (8) ACK/NACK of UL data, e.g. on E-DCH hybrid automatic repeat request (HARQ) acknowledgment indicator channel (E-HICH);

(9) ACK/NACK of DL data and channel quality indication (CQI) for link adaptation, e.g. on high speed dedicated physical control channel (HS-DPCCH);

(10) Mechanisms at end of data transmission, end of HS-RACH resource allocation period, collision detection, etc.

In PCT patent application no. WO2008038124, is described how the fast E-DCH allocation could be made possible after the random access preamble procedure is completed. This proposes that AICH (acquisition indication channel) could be used for E-DCH resource allocation.

However, the mechanism to allocate resources to the UE to enable it to use E-DCH is not specified. The mechanism for fast resource assignment, is open. How to fast and efficiently assign resources to UE to start E-DCH transmission from scratch without high collision probability, false alarm and miss detection is an open question.

In UMTS REL 99 to REL7, up to 16 packet random access channel (PRACH) signature sequences can be used in each random access channel (RACH) sub-frame for each RACH defined for the cell. The PRACH signature sequences (preambles) that UEs are permitted to use are broadcast as part of the system information. Not all sequences need to be made available and subdivision of signatures between UE classes is possible. The UE randomly selects one of the PRACH signature sequences applicable to it each time it transmits a PRACH preamble. Each time after having sent the PRACH preamble, it monitors the associated AICH (acquisition indication channel). 16 AICH signature patterns are returned on the AICH. There is a one-to-one mapping between the 16 possible PRACH signature sequences and the 16 AICH signature patterns. The UE checks the AICH for the AICH signature pattern associated with the PRACH signature sequence, that it used in the PRACH preamble. The AICH signature sequence is either coded with "0" (no response), "1" (ACK) or "−1" NACK. If the Node B fails to detect a PRACH preamble a "0" (no response) is indicated, if the Node B detects the preamble and grants permission to transmit the RACH message part a "1" (ACK) is indicated; and if the Node B detects the preamble, but refuses permission to transmit the message part, a "1" (NACK) is indicated. The resource that is used to transmit the message part is defined partly by the standards and partly by system information—broadcast control channel (BCCH). This proposal only supports direct one-to-one mapping.

Currently, the existing AICH cannot be used for a dynamic E-DCH resource allocation. This is because the existing AICH cannot be used dynamically. If one-to-one mapping (PRACH preamble—E-DCH resource mapping) were used, the Node B does not have any means to allocate a specific E-DCH resource because UE selects randomly PRACH preamble. So, no dynamic E-DCH resource allocation can be provided with basic AICH (one-to-one mapping). In other words, a randomly selected PRACH preamble would select the used E-DCH resource in one-to-one mapping and this specific resource may be already occupied by some other UE.

SUMMARY OF THE INVENTION

According to one aspect of the present invention, there is provided an apparatus comprising a transmitter arranged to transmit an indicating acquisition indication channel signature wherein thr indicating signature is used to indicate an enhanced dedicated channel resource to be used by a user equipment.

The transmitter can be arranged to transmit a further acquisition indication channel signature indicating that said indicating acquisition indication channel signature is to be evaluated to determine the enhanced dedicated channel resource to be used.

A physical random access signature sequence can be mapped to one or several acquisition indication channel signature sequences.

Preferably, the apparatus includes a selector configured to select an acquisition indication channel signature sequence from a sub-set associated with a physical random access signature sequence.

The acquisition indication channel signature may be associated with a set of enhanced dedicated channel resources.

Each acquisition indication channel signature may be associated with the set of enhanced dedicated channel resources by system information.

The acquisition indication channel signature may be associated with an enhanced dedicated channel resource index.

A signature can have two parameter sets associated therewith.

A first of the parameter sets can be indicated by a signature value 1 and a second one of the parameter sets by −1.

The number of signatures may comprise 32.

One acquisition indication channel signature can be used to provide a NACK indication.

A NACK may indicate that an enhanced dedicated channel resource is not assigned.

The mapping of the physical random access channel to one or more AICH signature sequences can be static.

Preferably, the mapping of the physical random access channel to one or more AICH signature sequences is dynamic.

Another aspect of the invention provides a network element comprising the apparatus including the transmitter and having any of the features as described above. The network element may be a node B or a radio network controller, for example.

According to another aspect of the present invention, there is provided an apparatus comprising a receiver arranged to receive an indicating acquisition indication channel signature wherein the indicating signature is used to indicate an enhanced dedicated channel resource to be used by said apparatus The receiver can be arranged to receive a further acquisition indication channel signature indicating that the indicating acquisition indication channel signature is to be evaluated to determine the enhanced dedicated channel resource to be used.

The apparatus can be arranged to decode an index value to determine a set of enhanced dedicated channels to be used.

An acquisition indication channel signature may be associated with the set of enhanced dedicated channel resources by system information.

The apparatus may be arranged to decode said acquisition indication channel signatures to identify an enhanced resource set index value.

According to another aspect of the invention, a user equipment is provided which includes the apparatus comprising a receiver and having any of the above-described features.

According to a further aspect of the present invention, there is provided a method comprising transmitting an indicating acquisition indication channel signature, wherein the indicating signature is used to indicate the enhanced dedicated channel resource to be used by a user equipment.

The method may further include transmitting a further acquisition indication channel signature indicating that the indicating acquisition indication channel signature is to be evaluated to determine the enhanced dedicated channel resource to be used.

Preferably, the method comprises mapping each physical random access signature sequence to one or more acquisition indication channel signature sequences.

The method may also comprise selecting an acquisition indication channel signature sequence from a sub-set associated with a physical random access signature sequence.

An acquisition indication channel signature may be associated with a set of enhanced dedicated channel resources.

Each acquisition indication channel signature may be associated with said set of enhanced dedicated channel resources by system information.

The acquisition indication channel signature may be associated with an enhanced dedicated channel resource index.

A signature may be associated with two parameter sets.

A first of the parameter sets may be indicated by a signature value 1 and a second one of said parameter sets by −1. The number of signatures may comprise 32.

The method may comprise using one acquisition indication channel signature to provide a NACK indication.

A NACK may indicate that an enhanced dedicated channel resource is not assigned.

Preferably the mapping of the physical random access channel to one or more AICH signature sequence is dynamic. However, mapping of the physical random access channel to one or more AICH signature sequences may also be static.

BRIEF DESCRIPTION OF FIGURES

For a better understanding of the present invention and how the same may be carried into effect, reference will now be made by way of example only to the accompanying drawings in which.

DETAILED DESCRIPTION OF EMBODIMENTS

Figure 13:
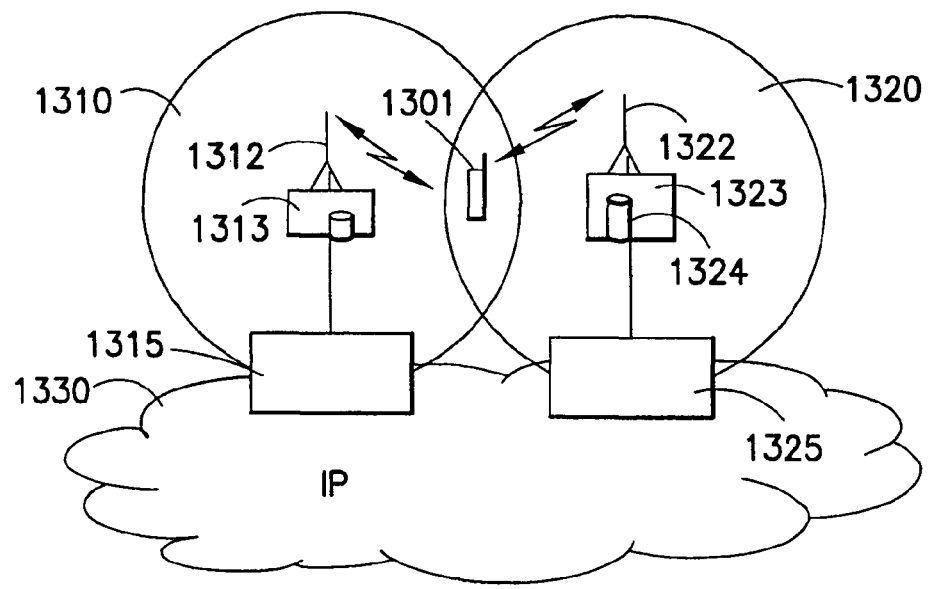
FIG. 13 shows a schematic presentation of two wireless access systems a mobile device may use for accessing a data network.
Figure 14:
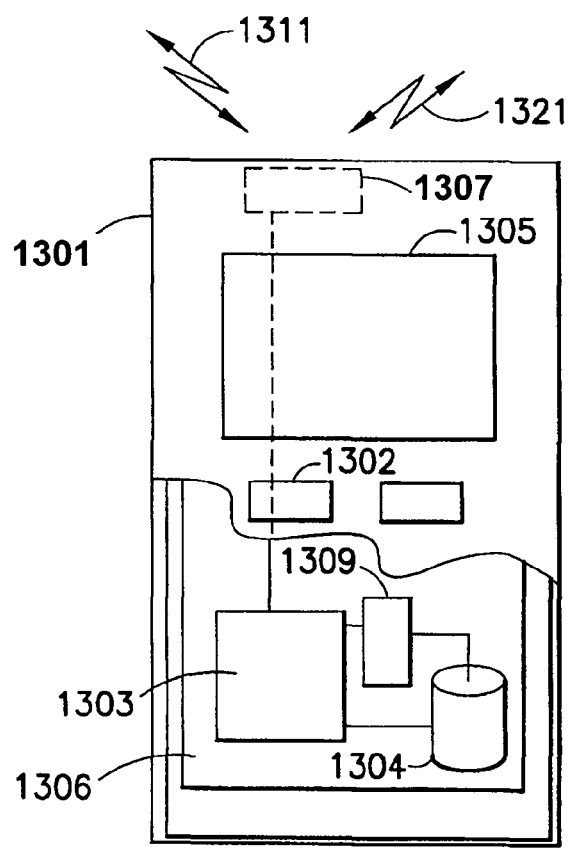
FIG. 14 shows a partially sectioned view of a mobile device.

Reference is made to FIGS. 13 and 14. A communication device can be used for accessing various services and/or applications provided via a communications system. In wireless or mobile systems the access is provided via an access interface between a mobile device 1301 and an appropriate wireless access system 1310 and 1320.

A mobile device 1301 can typically access wirelessly a communication system via at least one base station 1312 and 1322 or similar wireless transmitter and/or receiver node. Non-limiting examples of appropriate access nodes are a base station of a cellular system and a base station of a wireless local area network (WLAN). Each mobile device may have one or more radio channels open at the same time and may be connected to more than one base station.

A base station is typically controlled by at least one appropriate controller entity 1313, 1323 so as to enable operation thereof and management of mobile devices in communication with the base station. The controller entity is typically provided with memory capacity 1324 and at least one data processor.

A mobile device may be used for accessing various applications. For example, a mobile device may access applications provided in a data network 1330. For example, various applications may be offered in a data network that is based on the Internet Protocol (IP) or any other appropriate protocol.

In FIG. 13 the base station nodes 1312 and 1322 are connected to the data network 1330 via appropriate gateways 1315 and 1325 respectively. A gateway function between a base station node and another network may be provided by means of any appropriate gateway node, for example a packet data gateway and/or an access gateway.

FIG. 14 shows a schematic partially sectioned view of a mobile device 1301 that can be used for accessing a communication system via a wireless interface. The mobile device 1301 of FIG. 14 can be used for various tasks such as making and receiving phone calls, for receiving and sending data from and to a data network and for experiencing, for example, multimedia or other content.

An appropriate device may be provided by any device capable of at least sending or receiving radio signals 1311 and 1321. Non-limiting examples include a mobile station (MS), a portable computer provided with a wireless interface card or other wireless interface facility, personal data assistant (PDA) provided with wireless communication capabilities, or any combinations of these or the like. The mobile device 1301 may communicate via an appropriate radio interface arrangement of the mobile device. In FIG. 14 the radio interface arrangement is designated schematically by block 1307. The interface arrangement may be provided for example by means of a radio part and associated antenna arrangement. The antenna arrangement may be arranged internally or externally to the mobile device.

A mobile device is typically provided with at least one data processing entity 1303, 1309 and at least one memory 1304 for use in tasks it is designed to perform. The data processing and storage entities can be provided on an appropriate circuit board and/or in chipsets. This feature is denoted by reference 1306.

The user may control the operation of the mobile device by means of a suitable user interface such as key pad 1302, voice commands, touch sensitive screen or pad, combinations thereof or the like. A display 1305, a speaker and a microphone are also typically provided. Furthermore, a mobile device may comprise appropriate connectors (either wired or wireless) to other devices and/or for connecting external accessories, for example hands-free equipment, thereto.

Figure 1:
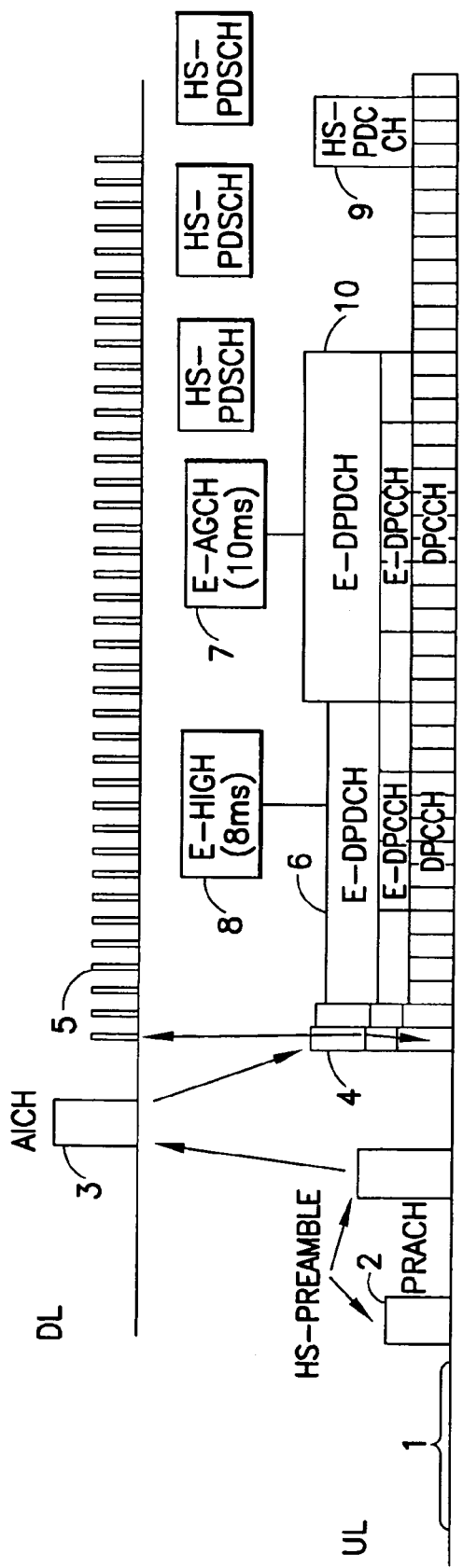
FIG. 1 shows a schematic HS-RACH procedure.
Figure 2:
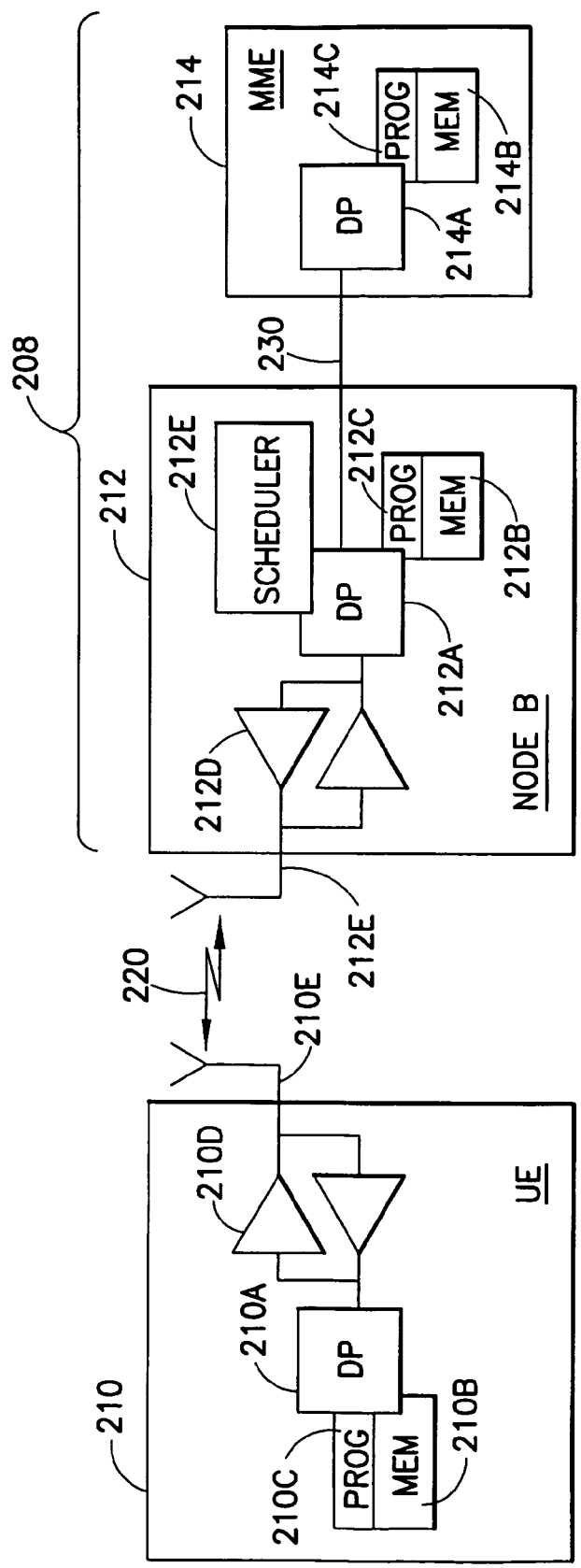
FIG. 2 shows a simplified block diagram of various electronic devices that are suitable for use in practicing the exemplary embodiments of this invention.

Reference is now made to FIG. 2 for illustrating a simplified block diagram of various electronic devices/apparatus that are suitable for use in practicing the exemplary embodiments of this invention. In FIG. 2 a wireless network 208 is adapted for communication between a UE 210 and a Node B 212 (e-Node B). The network 208 may include a serving mobility entity MME/gateway GW/radio network controller RNC 214 or other radio controller function known by various terms in different wireless communication systems. The UE 210 includes a data processor (DP) 210A, a memory (MEM) 210B that stores a program (PROG) 210C, and a suitable radio frequency (RF) transceiver 210D coupled to one or more antennas 210E (one shown) for bidirectional wireless communications over one or more wireless links 220 with the Node B 212.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 212 also includes a DP 212A, a MEM 212B, that stores a PROG 212C, and a suitable RF transceiver 212D coupled to one or more antennas 212E. The Node B 212 may be coupled via a data path 230 (e.g., S-1 or Iub interface) to the serving or other MME/GW/RNC 214. The MME/GW/RNC 214 includes a DP 214A, a MEM 214B that stores a PROG 214C, and a suitable modem and/or transceiver (not shown) for communication with the Node B 212 over the S-1 link 230.

Also within the node B 212 is a scheduler 212F that schedule the various UEs under its control for the various UL and DL subframes and channels. Once scheduled, the Node B sends messages to the UEs with the scheduling grants (typically multiplexing grants for multiple UEs in one message). Additionally and in accordance with these teachings, the node B 212 also schedules 212F the UEs using the AIs sent in the AICH when the UE requests access over the RACH (HS_RACH), which may be mapped to UL radio resources according to the embodiments detailed below. Generally, the Node B 212 of an LTE system is fairly autonomous in its scheduling and need not coordinate with the MME/GW 214 excepting during handover of one of its UEs to another Node B.

At least one of the PROGs 210C, 212C and 214C is assumed to include program instructions that, when executed by the associated DP, enable the electronic device to operate in accordance with the exemplary embodiments of this invention, as detailed above. Inherent in the DPs 210A, 212A, and 214A is a clock to enable synchronism among the various apparatus for transmissions and receptions within the appropriate time intervals and slots required, as the scheduling grants and the granted resources/subframes are time dependent.

The PROGs 210C, 212C, 214C may be embodied in software, firmware and/or hardware, as is appropriate. In general, the exemplary embodiments of this invention may be implemented by computer software stored in the MEM 210B and executable by the DP 210A of the UE 210 and similar for the other MEM 212B and DP 212A of the Node B 212, or by hardware, or by a combination of software and/or firmware and hardware in any or all of the devices shown.

In general, the various embodiments of the UE 210 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 210B, 212B and 214B may be of any type suitable to the local technical environment and may be implemented using any suitable data storage technology, such as semiconductor-based memory devices, magnetic memory devices and systems, optical memory devices and systems, fixed memory and removable memory. The DPs 210A, 212A and 214A may be of any type suitable to the local technical environment, and may include one or more of general purpose computers, special purpose computers, microprocessors, digital signal processors (DSPs) and processors based on a multi-core processor architecture, as non-limiting examples.

Embodiments of the invention may be applicable in the Access and resource assignment of the HS-RACH concept. E-DCH means Enhanced Dedicated Channel and up to Rel7 of 3GPP it has been available only in CELL_DCH state. However, this may be changed with later releases of the standard.

Figure 3:
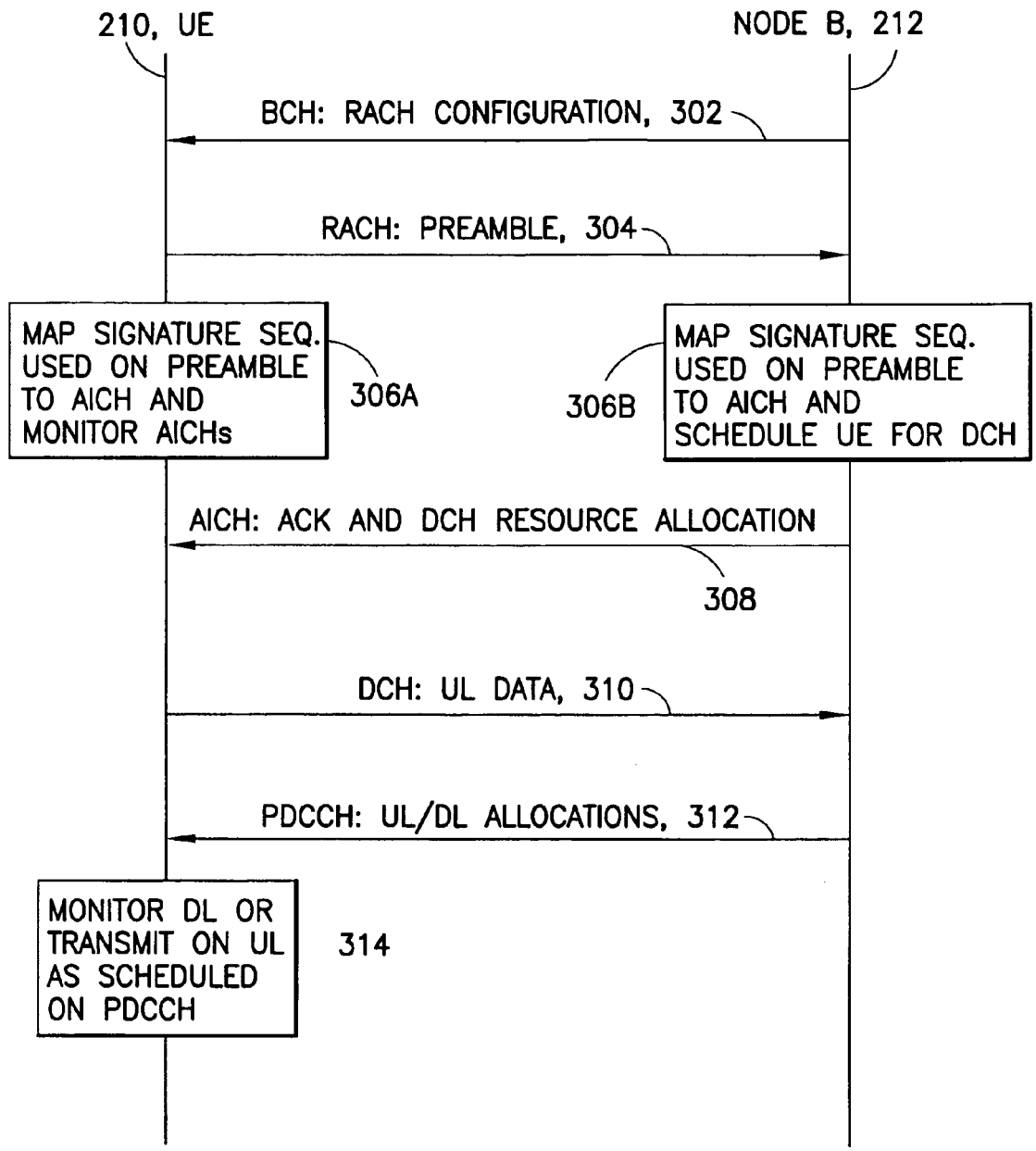
FIG. 3 is a signalling diagram according to an embodiment of the invention.

FIG. 3 is a signaling diagram that outlines general process steps according to an embodiment of the invention. In an embodiment each side of this signaling diagram may represent specific functional circuitry of an integrated circuit within the associated device (UE or Node B for example), elements of a software program executed by the appropriate DP of that device, some combination of software and firmware, or method steps. Further implementation details and variations are expanded upon below. At 302 the node B 212 transmits and the UE 210 receives on a broadcast channel (BCH or BCCH) as part of the system information the PRACH configuration or configurations, which may be the signature sequences that are available for UEs seeking access to the network cell. This is known. At step 304 the UE 210 has selected one of the available signature sequences from the broadcast message 302 and uses it in the preamble of a message the UE 210 sends to the Node B 212 on the RACH.

There is a mapping, locally stored in the memory of both the UE 210 and of the Node B 212, that associates a RACH signature sequence to an AICH signature sequence, though this mapping need not be one to one but one PRACH signature sequence to multiple AICH signature sequences as will be detailed. This mapping may be fixed or dynamically adjusted in the network, also detailed below. Now. The UE 210 takes the PRACH signature sequence it used in the preamble of message 304 and uses the map to find the associated AICH(s) at 306A and monitors that/those AICHs. The Node B does the same with its locally stored map but in the case of the node B at block 306B it also schedules the UE 210 for an uplink resource set (e.g., subframes/slots/frames of one or more channels). Using the map noted above, the node B 212 also selects an AICH that maps to the resource set that the node B is going to allocate to the UE 210 in response to its preamble 304. Thus there is a three-way mapping: RACH to AICH to resource set. Both node B 212 and UE 210 have this mapping, and the resource set may be indicated as an index set when the node B 212 signals the resource allocation to the UE.

At step 308 the node B 212 sends and the UE 210 receives on the AICH that maps to the signature sequence used on the PRACH an ACK of message 304 and an allocation of the resource set from block 306B. Instances where the node B 212 sends a NACK (e.g., no grant of UL resources), and when the node B does not respond to the UE's PRACH message 304 (e.g., non-receipt or improper decoding of the RACH preamble at the node B 212) are detailed below; FIG. 3 assumes the node B 212 receives and properly decodes the preamble 304 and allocates resources to the UE 210 in response. Using that same three-way mapping, the UE 210 determines from the AICH 308 the UL resource set being granted to it, and sends its data on the granted resource set DCH at 310. Further traffic is with the UE 210 normally established in the network: the node B 212 sends an allocation table on a packet data control channel PDCCH for that and other UEs at 312, the UE 210 receives it, finds its own allocation, and monitors the signalled DL resources and/or sends it data on the allocated UL resources as appropriate 314 to the received allocation table. Steps 312 and 314 are for context of the other portions of FIG. 3.

Embodiments of the invention is based on the use of RACH AICH signatures, which may be extended in number from 16 to 32, to indicate that a user equipment (UE) is able to use E-DCH and indicate the resources that it should use. Thus 16 additional signatures may be used, dedicated to E-DCH resource assignment. This is additional to the 16 signatures already used.

The basis of the invention is the use of AICH signatures to indicate the E-DCH resources that the UE is to use. The signatures used are either found from within the 16 that are available when a R99 AICH is used or from within a total of 32 that can be obtained as described below. In this section different embodiments are described. These embodiments are different methods of using the AICH to assign resources.

One-to-Many Mapping:

Each PRACH signature sequence is associated (mapped) with one or several AICH signature sequences.

In embodiments of the invention, if f an Extended AICH signature set is configured in the cell, it is detected which one of the defined Extended AICH signatures is present: The BTS can select any of the codes.

This association (mapping) can be provided as system information or by standardized rules and is static i.e. each PRACH signature is exclusively assigned $n \geq 1$ AICH signature sequences. Each signature is associated with a set of E-DCH resources by system information. The set of available signatures and the set of available Enhanced Uplink in CELL_FACH sub-channels may be provided for each Access Service Class (ASC).

In one implementation, the value assigned to each of the signatures on the AICH can be a) a NACK indicating that the resource is not assigned, b) a "no response" indicating the Node B did not detect the RACH preamble, or c) the UE is enabled to use E-DCH with the E-DCH parameters associated with the signature.

After transmitting the PRACH preamble the UE tests each of the 'n' associated signatures to detect if all are 0 (indicating no response), one is 1 (indicating E-DCH access permitted and the E-DCH resources to use are those associated with the Acked signature), or one or more are −1 (indicating a RACH NACK i.e. the preamble has been but E-DCH access is denied). Thus the UE checks the response for all $n^r$ associated signatures.

In another implementation one of the 'n' signatures is used to indicate RACH ACK (1), NACK (−1) or no response. This may be the first signature. The remaining n−1 signatures are used to indicate the E-DCH parameter set that is to be used. Each of these n−1 signatures can have two parameter sets associated with it, one indicated by a signature value 1 and one by −1. The UE uses the parameter set associated with the one signature that has a value of 1 or −1. A UE that has transmitted a RACH preamble first tests the one signature to detect ACK and, if this is detected, it then tests each of the remaining n−1 to identify the EDCH parameter set.

AICH combinations. A set of signatures is used to indicate whether a UE can use E-DCH and indicate a binary/ternary index value that maps to an E-DCH resource set. In one implementation a single AICH signature is associated with each RACH preamble and is used to indicate whether there is no RACH response (0), NACK (−1) or ACK (1). A further set of 'n' AICH signatures identifies an index value for the E-DCH parameter set to be used in a binary (ternary) way i.e. the values of each of the 'n' signatures (1/−1 or 1/0/−1) provides one symbol of an 'n' symbol index.

The mapping between the set of 'n' values and the RACH preamble can be fixed or flexible. In a fixed mapping a specific set of 'n' AICH signatures is exclusively assigned to each PRACH preamble. In a flexible mapping a set of 'n' can be dynamically associated with a PRACH preamble dependent on some criteria e.g. the rth set of 'n' signatures and the resource set it indicates applies to the $r^{th}$ preamble that is Acked.

Flexible mapping is thus allowed and valid mapping is transmitted via system information.

A UE that transmits a RACH preamble tests the AICH signature associated with ACK signaling for the RACH preamble that it used. If ACK is detected, it identifies and tests the 'n' signatures that indicate the E-DCH resource set that it should use. It uses the resource set associated with the index value it decodes. NACK may alternatively be used.

In a second implementation of the fixed type the single and 'n' signatures are combined to provide binary/ternary index values, two of which are used to indicate no RACH response and RACH NACK.

Each PRACH signature sequence is associated (mapped) with one or several AICH signature sequences. This association (mapping) can be provided as system information or by standardized rules.

The reception of a PRACH signature sequence for HS-RACH, which is associated (mapped) with n>=1 AICH signature sequences enables the Node B to return on the AICH up to $3^n$ different responses (or values), as each of the AICH sequences is either coded with "0", "1" or "−1". Each potential response can stand for either a) a NACK, b) a "no-response", or c) a resource allocation. The mapping between a coded combination of AICH signature sequences and a response may be provided by system information and/or by standardized rules.

As a wide range of responses can be returned by the Node B to a UE, dynamic EDCH resource allocation with the AICH is enabled. The number of AICH signatures is 16 (currently in the standard) or 32 (Hadamard codes of length 32).

Figure 4:
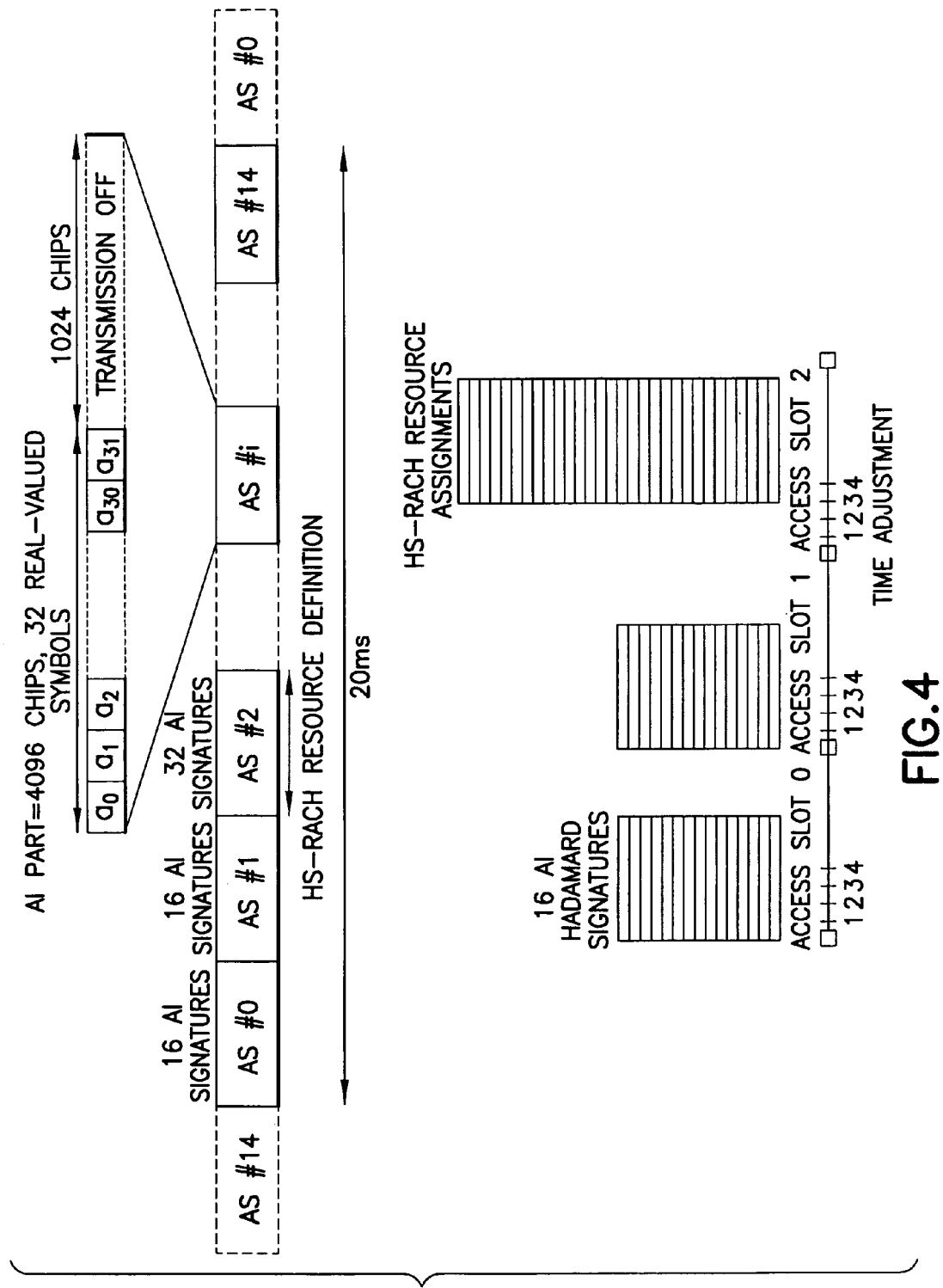
FIG. 4 shows a HS-RACH resource definition.

Timing of the AICH for signaling the resource index is shown by example by FIG. 4. Access slots (AS) are defined between legacy RACH users (as in the prior art) and HS-RACH users. In the HS-RACH access slots, all the signatures as a group is offset aligned (to retain orthogonality between signatures) within the AICH access slot (AS) by multiples of 32 chips up to 1024 chips. This offset indicates the HS-RACH resource set which the UE should use. The first two PRACH/AICH access slots (AS#0 and AS#1 of FIG. 4) can be used to indicate the +1/−1/0 to HS-RACH and legacy UEs or for legacy UEs only. If these access slots are used for both types of UE then the code mapped onto the acquisition indicator (AI) signature can also indicate resources and so an entire resource set (32 signature responses) would not need to be free to provide available resources to 32 UEs.

For example, assume a first UE is a legacy UE. It reads AS#0 and sees for its signature sequence matching what it used on the RACH preamble the ACK/NACK/no response coded in that sequence by the Node B. Assume an ACK is coded there; then the UE sends its message as in the prior art. A second UE uses the high-rate and fast allocation of these teachings. That second UE sees in AS#1 that the sequence it used on its RACH preamble is coded in AS#1 with an ACK also, but this second UE then goes to AS#2, and the position of its sequence in AS#2 is the map to the allocated radio resources that go with the ACK it saw in AS#1. The positioned sequences are shown in FIG. 4 as the expanded AS#i, as the vertically stacked signatures in AS#2. In a simple mapping, the position of the sequence in the AS#1 is an index (as in the subscripts of FIG. 4 at AS#i): 0, 1, 2, . . . . That index maps to a corresponding resource that is ordered similarly as the sequences in AS#i and AS#2 of FIG. 4.

Usage of "transmission-off" bits: Additional "transmission-off" bits can be used. An AICH transmission occupies 4096 chips within a 5120 chip slot. The 1024 chips which represent 4 symbols/8 bits are currently not being used. Using 4 symbols means that 4 Hadamard codes can be signaled at the end of the 32 real value symbols (the AI part of FIG. 4) that are used for transmission of the 16-32 AICH signatures. This can be used to provide the resource assignments for one or possibly two UEs that have detected Ack on the AICH signature that is associated with the RACH preamble that the UE used. Alternatively, it can be used to indicate a group of E-DCH resources within which the resource set indicated by 'one to many mapping' or 'AICH combinations' is contained.

Figure 5:
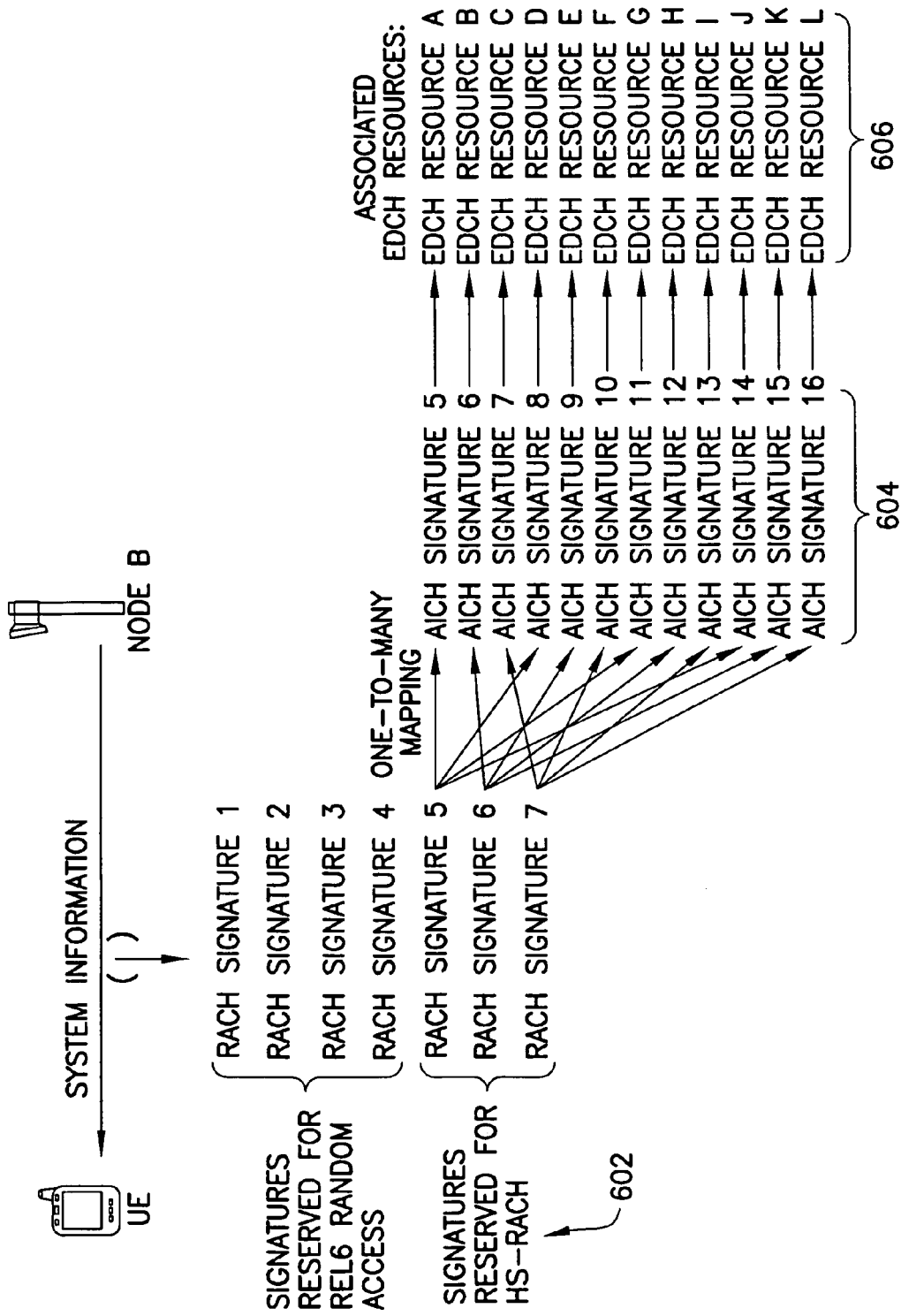
FIG. 5 shows an example of a PRACH signature to an AICH signature sequence one-to many mapping.

One-to-many mapping: FIG. 5 shows an example of one-to-many mapping when each HS-RACH signature 602 corresponds to four separate HS-RACH resource indices 604. The RACH (HS-RACH) preambles 4, 5, 6 each have four AICH signatures allocated to them each indicating a different E-DCH resource set 606. The UE tests each of the four AICH signatures 604 associated with the RACH preamble (signature) 602 that it used. If one has a value "1" it can use E-DCH with the resource set 606 assigned to that signature 604. The example uses 16 signatures, but 32 signatures could be made available through the use of one AICH and 32 Hadamard signatures, or two AICH each with 16 signatures.

Figure 6:
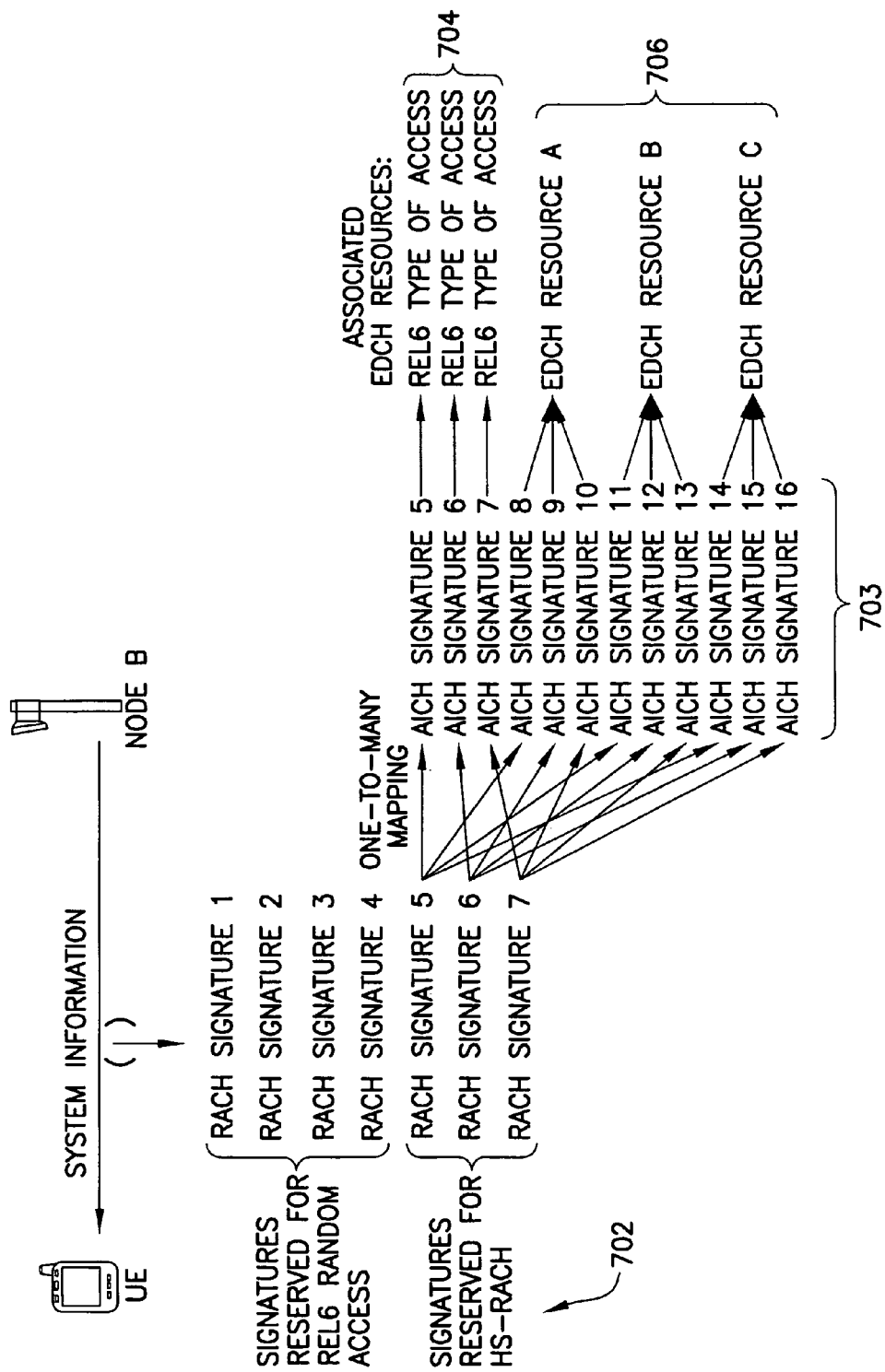
FIG. 6 shows another example of a PRACH signature to an AICH signature sequence one-to many mapping.

FIG. 6 shows an example where a Node B can also assign R'99 RACH resources for the UE which tried to get HS-RACH resources. Again four signatures 703 are associated with each HS-RACH preamble 702, however, one signature is used to indicate that the UE should use, or not use R6 message transmission 704 rather than E-DCH 706. The remaining three 706 indicate that the UE should use, or not use E-DCH and the resource set to use. In the example the same resource sets A, B, C are available for allocation to users of each of the RACH signatures 5 through 7. Legacy UEs are supported by both RACH signatures 1 through 4, and also 5 through 7 when those are mapped to Rel. 6 RACH resources 704.

Figure 7:
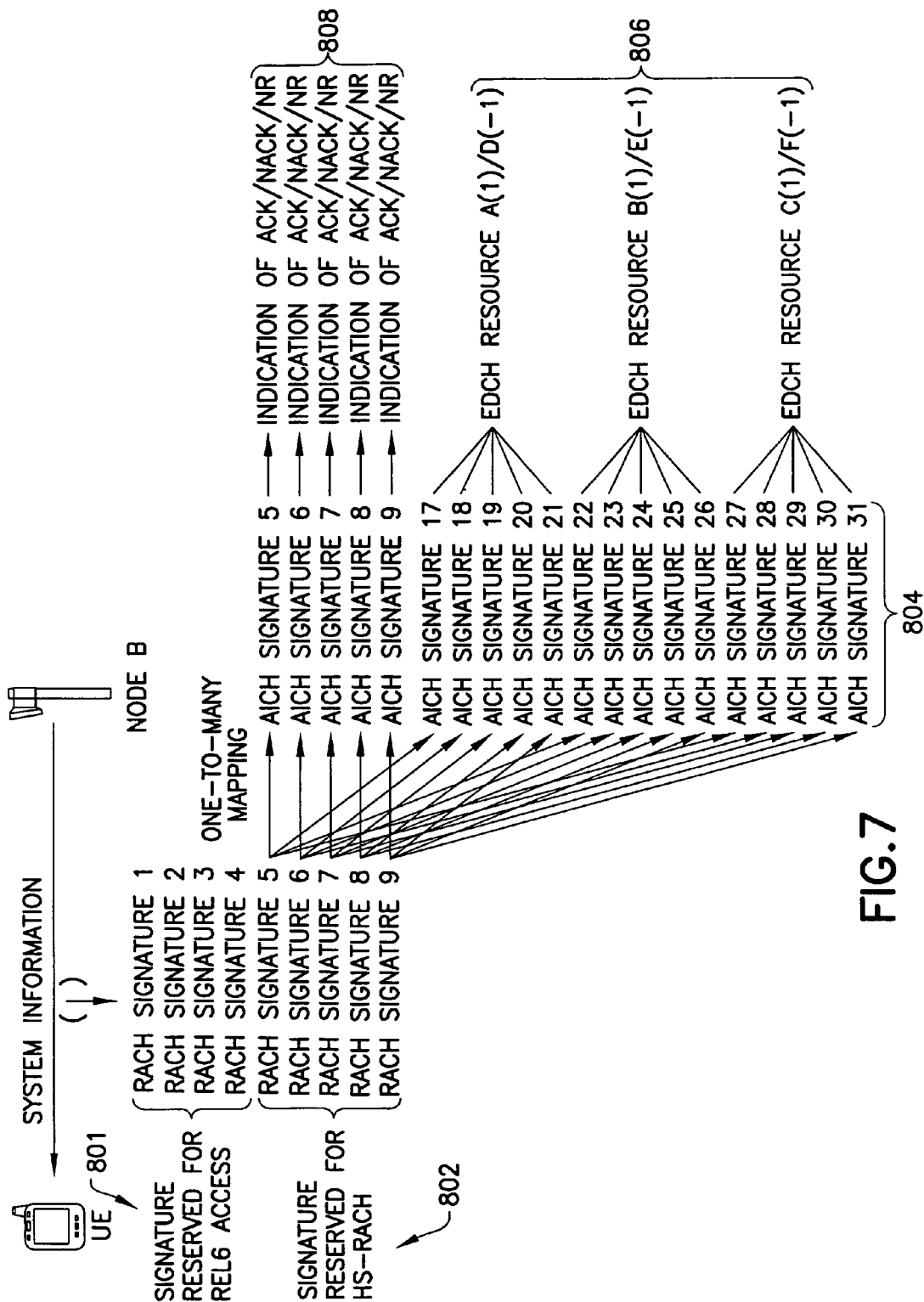
FIG. 7 shows another example of a PRACH signature to an AICH signature sequence one-to many mapping

FIG. 7 shows an example where a larger number of AICH signatures 804 are used and separate codes are used to indicate the RACH response and E-DCH resource sets 806. A UE first identifies from the signature 804 that is assigned for Ack/Nack/No response whether Ack is signaled 808 in a similar manner to R6 RACH 801. If Ack is detected 808 at the UE, it identifies the E-DCH resource set 806 it should use by detecting which of the additional signatures associated with the RACH preamble 802 is coded 1 or −1.

Advantages include that no modification of the L1 is required (UEs have to try to detect 'many' signatures) and very early resource allocation is possible. The number of (theoretically) usable PRACH signature sequences is limited to have sufficient AICH signature sequences for dynamic resource allocation. There is no full freedom for Node B to select free resource because of selected PRACH signature effects on available associated signatures AICH combinations: In one implementation a first set of AICH signatures are used to indicate a positive acknowledgement (+1) or a negative acknowledgement (−1) to the RACH preamble in the same way as in Rel'99. A second set of AICH signatures are used for resource assignment to HS-RACH UEs which have been positively acknowledged in the first set of AICH signatures:

The second set of signatures are subdivided into sets of 'n' signatures each of which can contain a binary (if signatures are assigned the values 1, −1) or ternary (if signatures are assigned the values 1, 0, −1) representation of a resource set index value. The index value can be mapped to resource parameters by way of a definition signaled in system information or by way of a formula, possibly using parameters signaled in system information.

There are two ways of mapping the sets of n>1 resource signatures to a PRACH preamble, fixed or flexible. In the case of a fixed mapping each RACH preamble is assigned a specific set of 'n' in a similar way to that described for the 'one to many mapping' mechanism described above, except that instead of one of the n signatures identifying the E-DCH resource set all n contribute to the binary (ternary) index value. In the case of the flexible mapping, the method described here is that the rth set of 'n' is mapped to the $r^{th}$ RACH preamble that is Acked in the first signature set. The flexible mapping allows more RACH preambles to be available for a given AICH size because, to avoid RACH preamble contention, only a fraction of signatures will be Acked within a sub-channel.

Figure 8:
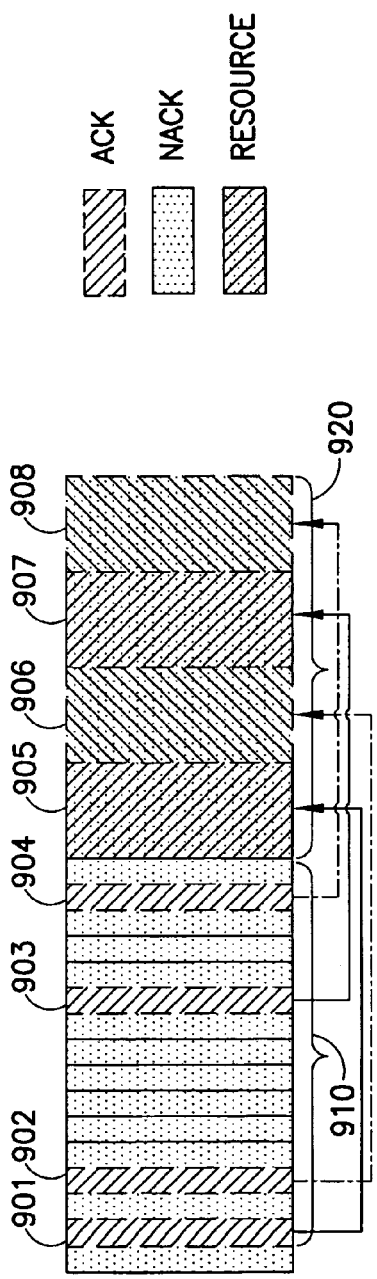
FIG. 8 shows an AICH extension resource indication.

The flexible method may operate as shown in FIG. 8 as follows:

1. The UE needs to receive the primary AICH signatures 910 (first set of signatures) for the RACH preamble that it used and all lower numbered preambles. If its own preamble was Acked then it identifies its position in the sequence of Acked preambles i.e. it determines .r'.

2. The index of the UE acknowledgement in the first set of signatures 910, 'r', maps to the $r^{th}$ set of 'n' signatures in the second set of signatures 920.

3. The UE decodes the signatures within its assigned set of 'n' indicating E-DCH resources and from their binary or ternary values identifies the resource set index value. From this it can obtain the E-DCH resource values by reference to system information or calculation.

For example, if a first UE identifies its ACK at 902, then it needs to receive all AICHs at 902 and lower. This is the first set of AICH signatures for that first UE. Assuming in FIG. 9 that the first UE is ACKed at 902 and it stops receiving further AICHs after receiving its ACK, then it has received in FIG. 9 four AICHs, of which two are ACKed, its own ACK at 902 and some other UE's ACK at 901. The remaining two of those four AICHs received by the first UE are not ACKed in FIG. 9, and so not outlined in dashed line. The universe of the first set of AICH signatures is designated 910 in FIG. 9, but in particular the first UE need not monitor the entire set since it saw its ACK at 902. The first UE counts its ACK as position 2, the second ACK, so the index for the first UE is r=2. Position 2 maps to the second AICH 906 within the second set 920 of the n=4 AICH signatures, and that is where the first UE gets its resource allocation. A second UE sees its ACK at 904 of the first set 910, so r=4 since it is the fourth ACK in the first set 910. That r=4 ACK maps to n=4 of the second set 920, so the resource allocation for the second UE is given at AICH sequence 908 of FIG. 8. Similar mapping is shown for the other ACKed AICH sequences in the first set 910: ACKed AICH sequence 901 maps to AICH sequence 905 for the granted resource parameter set, and ACKed AICH sequence 903 maps to AICH sequence 907 for the granted resource parameter set to the UE that used the sequence in its RACH preamble that maps to the sequence coded with the ACK at 903.

The number of Acks that can be signaled (and number of E-DCH resource sets that can be assigned) depends on the number of sets of 'n' signatures that are available for resource assignment and the value of 'n'. In turn, the larger 'n' the greater the range of index values that can be signaled. For example, if 16 signatures are available and n=4 index values with a range of 16 (binary) or 81 (ternary) can be signaled to 4 UEs. If n=2 the values are 419 and 8 respectively. For the special case of n=1 the signature index value can be used to identify the resource set rather than a binary/ternary value.

The fixed method does not require any ranking by the UE, it need only receive the signature in set one that is associated with the RACH preamble that it used. If this is detected as an Ack then it decodes the set of 'n' signatures that associated with the preamble in a fixed mapping to identify the resource set index.

A second implementation of the fixed method is to combine the Ack and resource indication signatures into one set and use two values in the $2^{n+1}/3^{n+1}$ possibilities to indicate RACH Nack and RACH no response. This increases the number of resource set index values that can be signaled above $2^n/3^n$.

Figure 9:
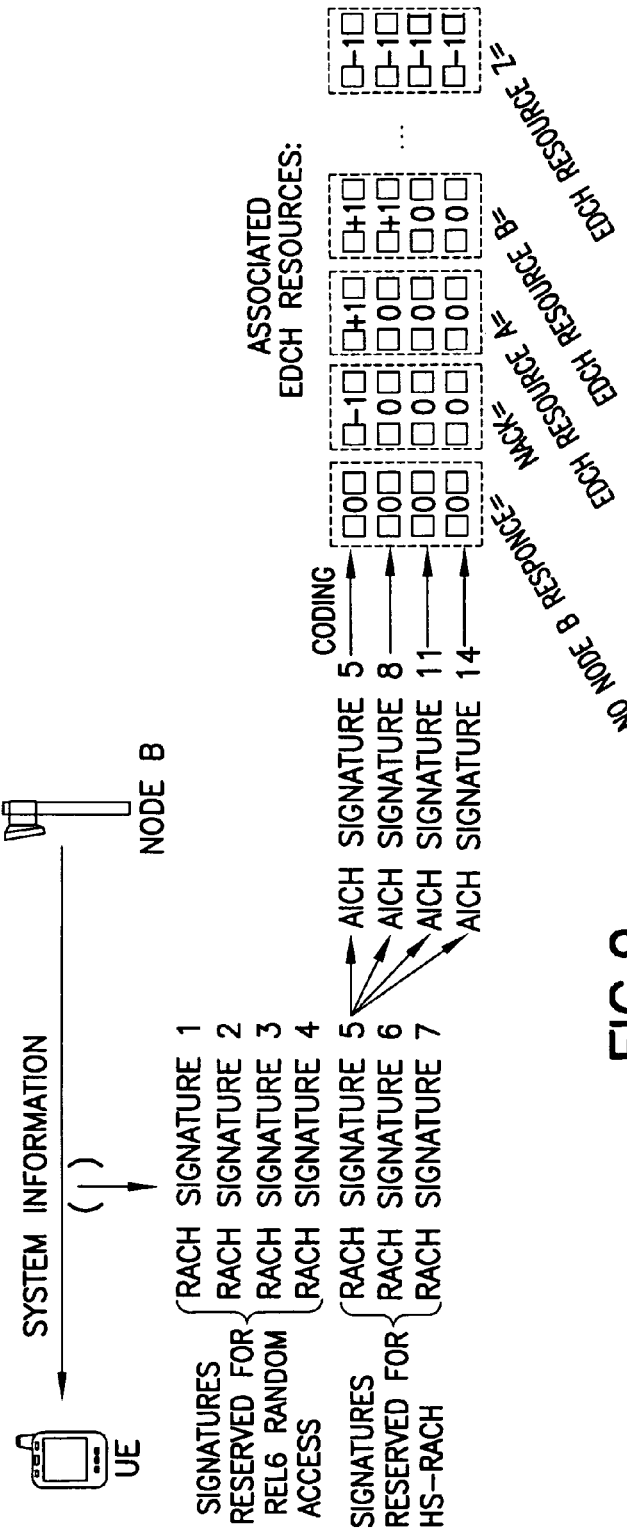
FIG. 9 shows another example of a PRACH signature to an AICH signature sequence one-to many mapping with multiple AI use.

FIG. 9 illustrates a fixed mapping case. PRACH signature sequence 5 is associated with AICH signature sequence 5, 8, 11, and 14, each of which can be coded with "1", "0", or "−1". Therefore $3^4$=81 different combination can be returned to the UE, when it monitors the AICH. One combination can stand for NACK, e.g. ("1", "0", "0", "0"). A second combination indicates no-response-by-the-Node-B, e.g. ("0", "0", "0", "0"). All other combination may stand for different resource allocations. (Note: if a small number of PRACH signature sequences are used in the cell, e.g. many AICH signature sequences can be used to convey resource related information, then some of them can act as redundancy (bits) to increase the reliability of the transmission. In the example of FIG. 6, ATOM signature sequence 5 and 8 could be coded identically, and so could 11 and 14.)

Figure 10:
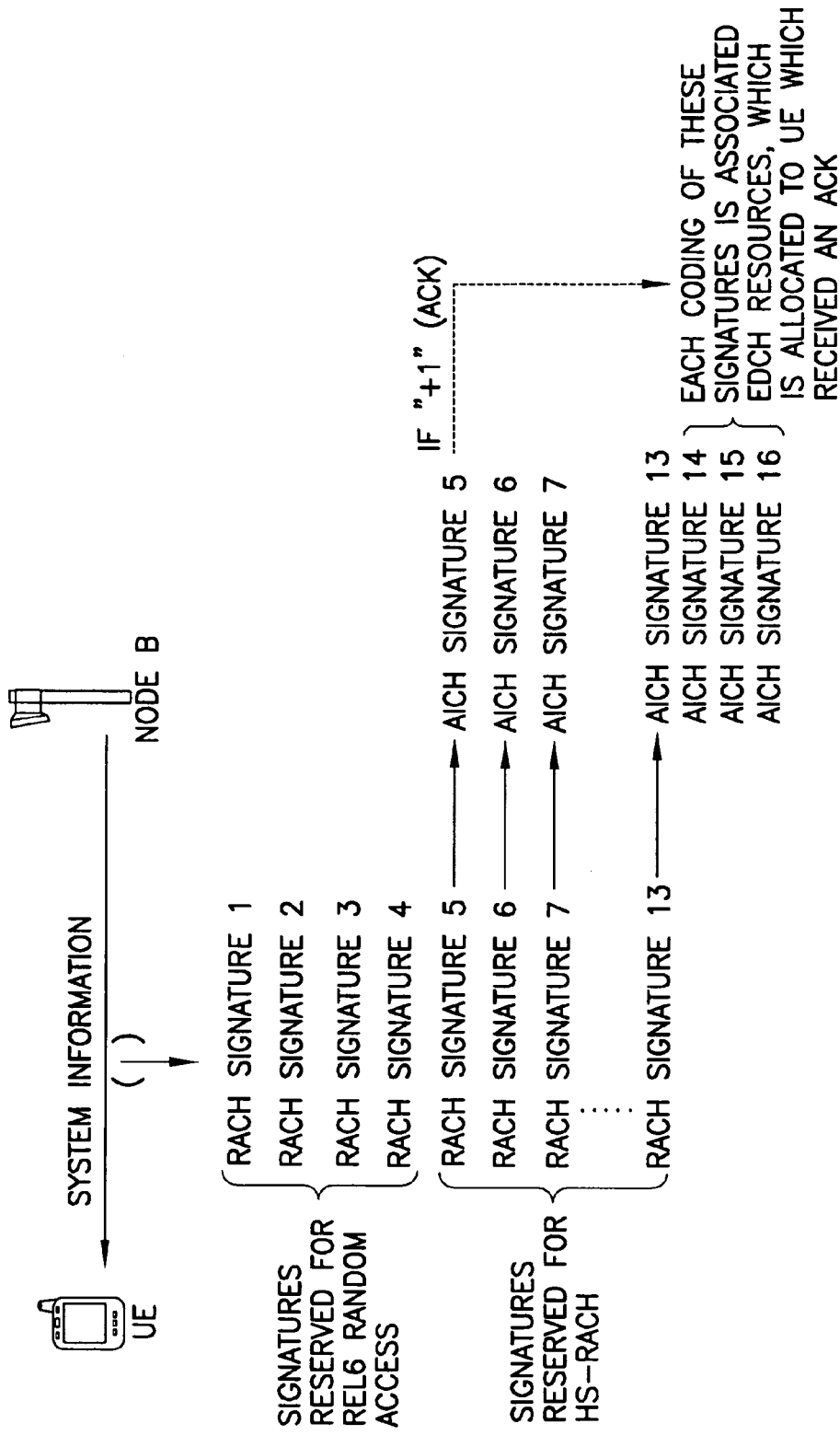
FIG. 10 shows an example of AICH signature sequences used for dynamic resource allocation.

FIG. 10 illustrates a flexible implementation where only one set 1103 of 3 signatures, 14, 15, 16 is available for E-DCH resource set indication. Only one RACH preamble can be Acked for E-DCH access in a sub-channel.

Figure 11:
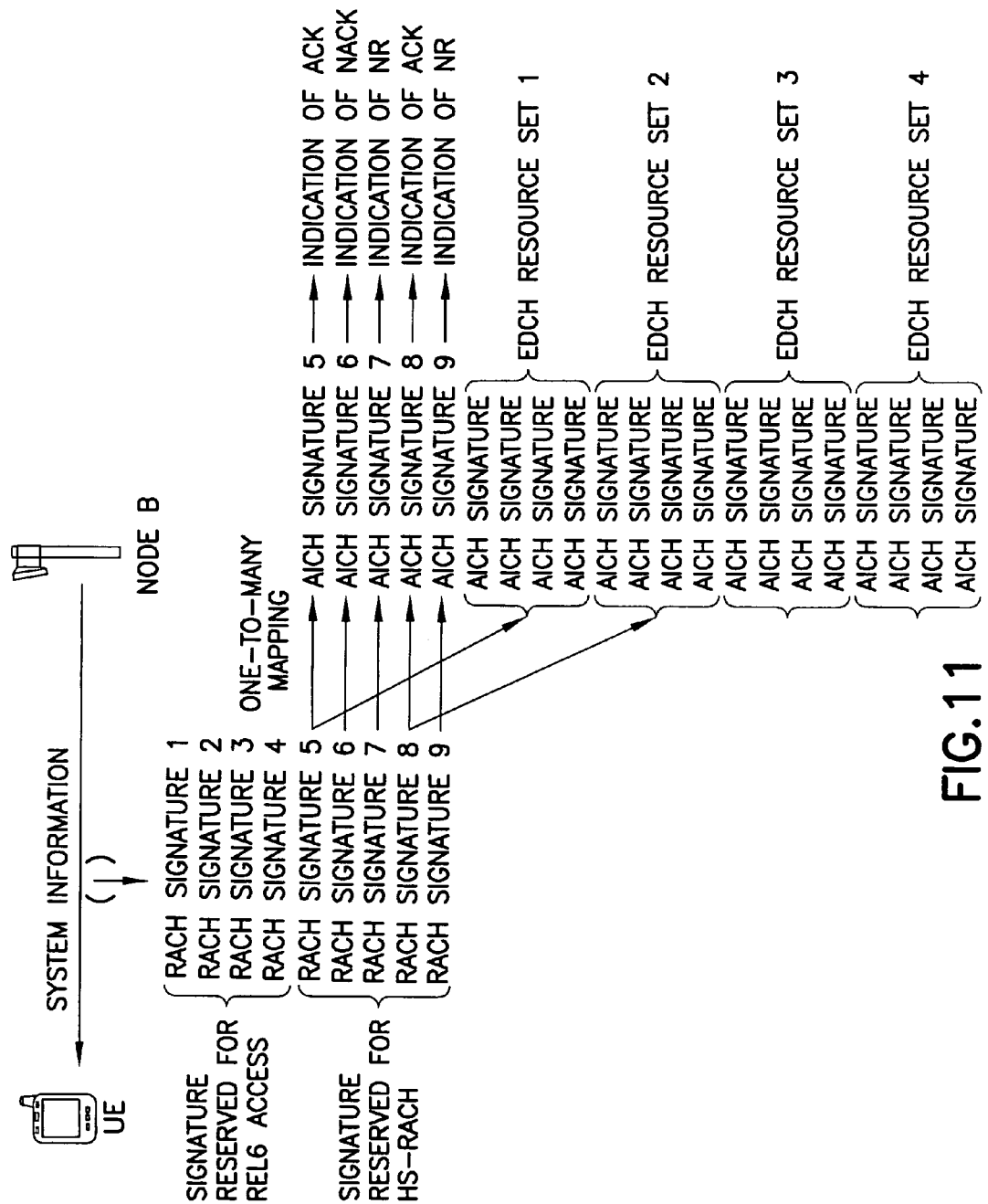
FIG. 11 shows another example of AICH signature sequences used for dynamic resource allocation

FIG. 11 illustrates a flexible implementation where signatures x and y are Acked, the UE that used RACH preamble x decodes the signatures associated with E-DCH resource set 1 and the UE that used RACH preamble y decodes E-DCH resource set 2. If 3 or 4 bits are enough to signal the resources which the UE needs then some embodiments of the present invention have the advantage of time saved to signal the resources and in turn this saves signaling.

Embodiments of the invention may be flexible as the capacity for the UE resource assignment sets are either used or not used and if they are not used then nothing additional needs to be signaled.

Flexibility: The number of simultaneous users that can be supported i.e. 3, 4, 5, 6, 7 bits can be chosen depending on the implementation. (The cost is that the number of Acks that can be treated per RACH occasion goes down as the number of bits increases.) There is the potential to trade off resource assignment set size and P-ACH response capacity on a dynamic basis.

However, the HS-RACH UE needs to receive all specified signatures (both first and second set of signatures) and order them before understanding which out of the remaining codes to read for resources. Some embodiments may be dependent on the reliability of receiving all of the Hadamard codes correctly. (However if a UE can receive one code correctly, then it is reasonable to assume that it can receive them all correctly). Furthermore, the number of responses that can be supported may go down as the number of resource sets is increased and the mutual interference between AICH codes may be increased.

In the above signature values are used to indicate E-DCH resource set index values. The range that can be assigned is limited by the number of signatures that are used to signal each resource set index e.g. if 3 are used then the maximum range is 8 or 27 depending on the modulation used (binary or ternary). This may limit the maximum number of UEs that can simultaneously use HS-RACH. A method of increasing the number of simultaneous HS-RACH users is as follows.

The resource set subset used in a particular AICH can be linked to the RACH sub-channel number to which it relates in a cyclic manner. For example, cycle lengths of 3, 5 or 15 may be appropriate for the 15 RACH sub-channels. Far example a cycle of length 3 and sub-set size of 16 allows up to 48 resource sets as is illustrated in FIG. 10 below. The advantage of this method is that the resource set size is increased without any signaling overhead, however, it reduces Node B flexibility in assigning resource sets.

In the above, the sub-channels used in the cycle need not be consecutive, for example the three sub-channels may be in sub-channels 5, 10 and 15 because all sub-channels are not always made available for RACH access. This is configured by system information. Furthermore, only a sub-set of the sub-channels used may be assigned for HS-RACH access.

An alternative to using RACH sub-channels as the basis for implicit resource sub-set assignment is to use the UMTS system frame number (cyclic sequence number of 10 ms consecutive radio frames) of the start of the 20 ms RACH frame as the basis i.e. the HS-RACH E-DCH resource sub-sets can cycle over a sequence of 'n' 20 ms RACH frames.

An alternative method to indicate a resource subset is to use one or more AICH signatures to indicate the binary/ternary value of the resource set sub-set that applies to the particular AICH. Some embodiments of the invention may improves early resource allocation, thus operators and manufacturers benefit.

Figure 12:
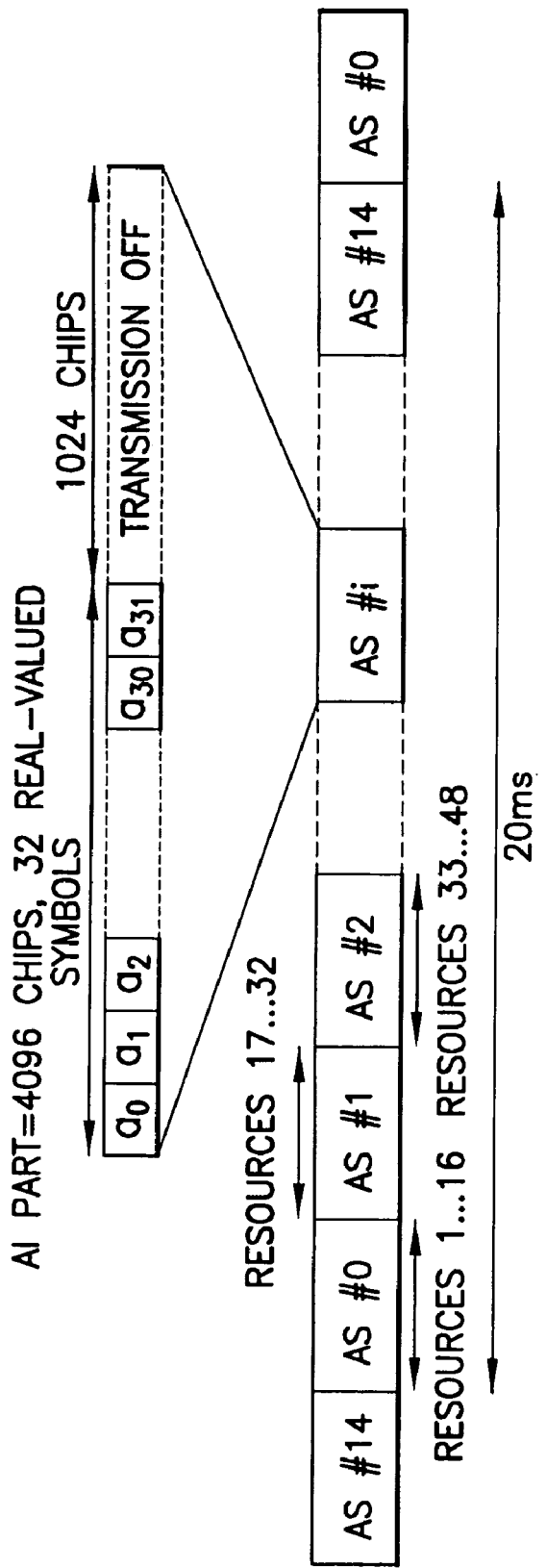
FIG. 12 shows an example of AICH resource set identities being implicit on the associated RACH sub-channel.

So in summary, advantages of the one-to-many mapping is that no modification of the L1 signaling is required (the UE will try to detect 'many' signatures), and a very early resource allocation is possible. The advantages for using combined AICH sequences for signaling is that if 3 or 4 bits are enough to signal the resources which the UE needs (as appears quite feasible) then this invention brings the main advantages of time saved to signal the resources and in turn this saves signalling. Certain implementations are flexible as the capacity for the UE resource assignment sets are either used or not used and if they are not used then nothing additional needs to be signalled. The number of simultaneous users that can be supported can be chosen depending on the implementation, though the cost is that the number of ACKs that can be treated per RACH occasion goes down as the number of bits increases as noted above with reference to FIG. 12. Further, there is the potential to trade off resource assignment set size and RACH response capacity on a dynamic basis allowing the node B scheduler more flexibility.

An AICH signature sequence or combination of AICH signature sequences may be associated with an E-DCH resource allocation. A PRACH signature sequence may be associated with multiple AICH signature sequences (one-to-many mapping), allowing dynamic resource allocation by the Node B. Each AICH signature sequence is thereby associated with exactly one PRACH signature sequence or multiple PRACH signatures.

Embodiments of the invention may be applicable to channels other than those discussed.

It should be appreciated that although the preferred embodiments of the invention have been described in the context of the 3GPP proposals, embodiments of the present invention may be used within the framework provided by any other standard whether it has proposed or has yet to be evolved. Embodiments of the invention may also be used in scenarios where there is no standardized framework.

The embodiments of this invention may be implemented by computer software executable by a data processor, such as in the processor entity, or by hardware, or by a combination of software and hardware.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
    a transmitter arranged to transmit an indicating acquisition indication channel signature wherein said indicating acquisition indication channel signature is used to indicate an enhanced dedicated channel resource to be used by a user equipment, where the enhanced dedicated channel resource comprises an uplink resource set;

a memory configured to store a mapping associating a random access channel signature sequence to one or more indicating acquisition indication channel signatures, where the indicating acquisition indication channel signatures comprise the indicating acquisition indication channel signature; and a data processor configured to use the stored mapping to relate a random access channel signature sequence to one or more of the indicating acquisition indication channel signatures;

configured to relate each of the indicating acquisition indication channel signatures to the uplink resource set such that there is a three-way mapping between the random access channel signature sequence, the one or more indicating acquisition indication channel signatures and the uplink resource set;

configured to select one indicating acquisition indication channel signature of the one or more of the indicating acquisition indication channel signatures which are mapped to the random access channel signature sequence; and configured to transmit the selected indicating acquisition indication channel signature.

2. The apparatus as claimed in claim 1, wherein the apparatus is comprised in a network element.

3. Apparatus comprising:
a receiver arranged to receive an indicating acquisition indication channel signature wherein said indicating acquisition indication channel signature is used to indicate an enhanced dedicated channel resource to be used by said apparatus;

a memory configured to store a mapping associating a random access channel signature sequence to the indicating acquisition indication channel signature; and a data processor configured to use the stored mapping to relate a random access channel signature sequence to the indicating acquisition indication channel signature and to an uplink resource set such that there is a three-way mapping between the random access channel signature sequence, the indicating acquisition indication channel signature and the uplink resource set.

4. The apparatus claimed in claim 3, wherein the apparatus is comprised in a user equipment.

5. A method comprising:
transmitting an indicating acquisition indication channel signature wherein said indicating acquisition indication channel signature is used to indicate an enhanced dedicated channel resource to be used by a user equipment;

mapping a physical random access channel signature sequence to one or more indicating acquisition indication channel signatures, where the indicating acquisition indication channel signatures comprise the indicating acquisition indication channel signature;

selecting one indicating acquisition indication channel signature of the indicating acquisition indication channel signatures which are mapped to the physical random access channel signature sequence; and transmitting the selected indicating acquisition indication channel signature which relates to the enhanced dedicated channel resource such that there is a three way mapping between the physical random access channel signature sequence, the one or more indicating acquisition indication channel signatures and the enhanced dedicated channel resource.

6. A method as claimed in claim 5, comprising:
transmitting a further acquisition indication channel signature indicating that said indicating acquisition indication channel signature is to be evaluated to determine the enhanced dedicated channel resource to be used.

7. A method as claimed in claim 5, comprising mapping each of a plurality of physical random access channel signature sequences to the one or more indicating acquisition indication channel signatures.

8. A method as claimed in claim 7, wherein the mapping of said physical random access channel signature sequence to the one or more acquisition indication channel signatures is dynamic.

9. A method as claimed in claim 5, comprising selecting an indicating acquisition indication channel signature sequence from a sub-set associated with the physical random access channel signature sequence.

10. A method as claimed in claim 5, wherein the indicating acquisition indication channel signature is associated with a set of enhanced dedicated channel resources.

11. A method as claimed in claim 10, comprising associating each of said indicating acquisition indication channel signature with said set of enhanced dedicated channel resources by system information.

12. A method as claimed in claim 5, comprising associating the indicating acquisition indication channel signature with an enhanced dedicated channel resource index.

13. A method as claimed in claim 5, comprising associating said indicating acquisition indication channel signature with two parameter sets.

14. A method as claimed in claim 13, wherein a first of said parameter sets is indicated by a signature value 1 and a second one of said parameter sets by −1.

15. A method as claimed in claim 14, comprising using one of said indicating acquisition indication channel signatures to provide a not-acknowledged (NACK) indication.

16. A method as claimed in claim 5, wherein the number of said indicating acquisition indication channel signatures comprises 32.

17. A method as claimed in claim 5, wherein a not-acknowledged (NACK) indicates that the enhanced dedicated channel resource is not assigned.

18. A method as claimed in claim 5, comprising using one of said indicating acquisition indication channel signatures to provide a not-acknowledged (NACK) indication.

* * * * *